US007519944B2

(12) United States Patent
Havin et al.

(10) Patent No.: US 7,519,944 B2
(45) Date of Patent: Apr. 14, 2009

(54) COMPUTER METHOD AND SYSTEM FOR EXECUTING POST-PROCESSING LOGIC DEPENDING ON FUNCTION EXIT TYPE

(75) Inventors: Victor Leon Havin, Mountain View, CA (US); Allan Kendall Pratt, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 664 days.

(21) Appl. No.: 10/983,129

(22) Filed: Nov. 5, 2004

(65) Prior Publication Data

US 2006/0101477 A1 May 11, 2006

(51) Int. Cl.
*G06F 9/44* (2006.01)
(52) U.S. Cl. ...................................... 717/106; 717/118
(58) Field of Classification Search ................. 717/130, 717/106, 118
See application file for complete search history.

(56) References Cited

U.S. PATENT DOCUMENTS

| | | | | |
|---|---|---|---|---|
| 5,628,016 | A * | 5/1997 | Kukol | 717/140 |
| 5,778,233 | A * | 7/1998 | Besaw et al. | 717/154 |
| 6,247,169 | B1 * | 6/2001 | DeLong | 717/131 |
| 6,662,359 | B1 | 12/2003 | Berry et al. | |
| 6,931,635 | B2 * | 8/2005 | Inagaki et al. | 717/157 |
| 6,934,832 | B1 * | 8/2005 | Van Dyke et al. | 712/244 |
| 6,996,590 | B2 * | 2/2006 | Borman et al. | 707/206 |
| 7,065,633 | B1 * | 6/2006 | Yates et al. | 712/227 |
| 2004/0243982 | A1 * | 12/2004 | Robison | 717/132 |

FOREIGN PATENT DOCUMENTS

WO      WO 02/071182 A2     9/2002

OTHER PUBLICATIONS

Filman et al., "Aspect-Oriented Software Development", Oct. 6, 2004 by Addison Wesley professional, http://www.informit.com/store/product.aspx?isbn=0321219767, http://www.informit.com/articles/printerfriendly.aspx?p=340868, pp. 1-5.*
Shelekhov, V.L. and S.V. Kuksenko, "Data Flow Analysis of Java Programs in the Presence of Exceptions," In *Perspectives of System Informatics, Third International Andrei Ershov Memorial Conference, PSI '99*, Akademgorodok, Novosibirsk, Russia, Jul. 6-9, 1999 (pp. 389-395).

(Continued)

*Primary Examiner*—Chih-Ching Chow
(74) *Attorney, Agent, or Firm*—Hamilton, Brook, Smith & Reynolds, P.C.

(57) ABSTRACT

The present invention method and system ensure execution of post processing logic for a subject computer program routine (e.g., JAVA application) without wrapping the routine inside another. The invention system and method include different sets of exit handling steps for different types of exits in the subject routine. In each set of exit handling steps, the post processing logic is executed. Flow of control of the subject routine resumes at the respective exit point.

18 Claims, 5 Drawing Sheets

OTHER PUBLICATIONS

Harkema, M. et al., "Performance Monitoring of Java Applications," *Workshop on Software and Performance, Proceedings of the Third International Workshop on Software and Performance*, ACM Press, Rome, Italy, 2002 (pp. 114-127).

Alkhalifa, Z. et al., "Design and Evaluation of System-Level Checks for On-Line Control Flow Error Detection," *IEEE Transactions on Parallel and Distributed Systems* 10(6):627-641, Jun. 1999.

Hagiya, M. and A. Tozawa, "On a New Method for Dataflow Analysis of Java Virtual Machine Subroutines," *Static Analysis, 5th International Symposium, SAS '98 Proceedings*, Pisa, Italy, Sep. 1998 (pp. 17-32).

Alkhalifa, Z. and V.S.S. Nair, "Design of a Portable Control-Flow Checking Technique," *Proceedings 1997 High-Assurance Engineering Workshop, IEEE Computer Society*, Los Alamitos, California, 1997 (pp. 120-123).

\* cited by examiner

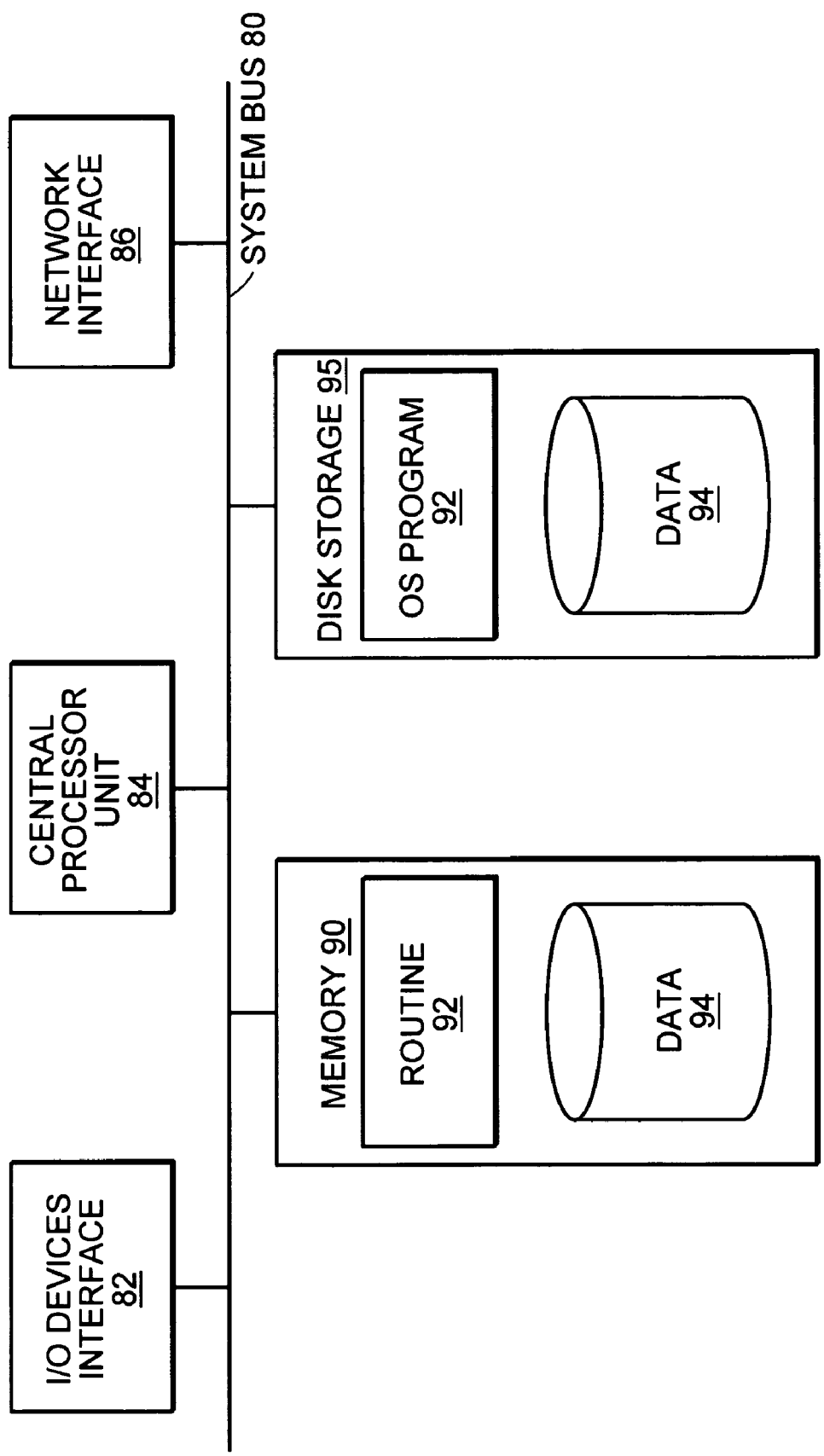

COMPUTER METHOD AND SYSTEM FOR EXECUTING POST-PROCESSING LOGIC DEPENDING ON FUNCTION EXIT TYPE

BACKGROUND OF THE INVENTION

It is sometimes desirable to add postprocessing logic to a JAVA method after that method is compiled—for example, to insert "probe" logic that will track the method's execution state and return value.

Some existing solutions to this problem involve wrapping the existing method inside a new method. The outer "wrapper" method performs postprocessing steps after the "wrapped" method exits. See the IBM project called Hyper-Probe for an example of this.

However, such an approach sacrifices execution-path fidelity. Debugging and tracing tools will see the newly-created "wrapper" methods, which can pollute the data and confuse the user. Also, adding wrappers makes the class larger, potentially doubling the number of methods in the class. JAVA class files impose various limits, thus it might not be possible to add a new method without violating one of those limits. An example of a limit is "65536 entries in the constant pool."

SUMMARY OF THE INVENTION

The present invention addresses the foregoing problems of the prior art.

In a preferred embodiment, the present invention method and system ensure execution of post processing logic for a subject computer program routine (e.g., JAVA application method) without wrapping the routine inside another. The invention system and method include different sets of exit handling steps for different types of exits in the subject routine. In each set of exit handling steps, the post processing logic is executed. Flow of control of the subject routine resumes at the respective exit point.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5 is a block diagram of a computer of the network of FIG. 4.

DETAILED DESCRIPTION OF THE INVENTION

Applicants have discovered that by using byte-code modification, the flow of control in a subject method can be changed so all possible exit points pass through specified postprocessing logic without wrapping the method inside another method.

In general, JAVA application methods can exit in two different ways. One way is "ordinary exit" involving the various forms of the return instruction. The other way is by "exception", whether thrown by the method itself, thrown by a called method, or thrown by the JAVA runtime. An example of the latter is NullPointerException.

In order to insert postprocessing logic that will execute regardless of how the method exits, both of these two exit mechanisms or types generally speaking (ordinary and exception) must be covered.

Figure 1:
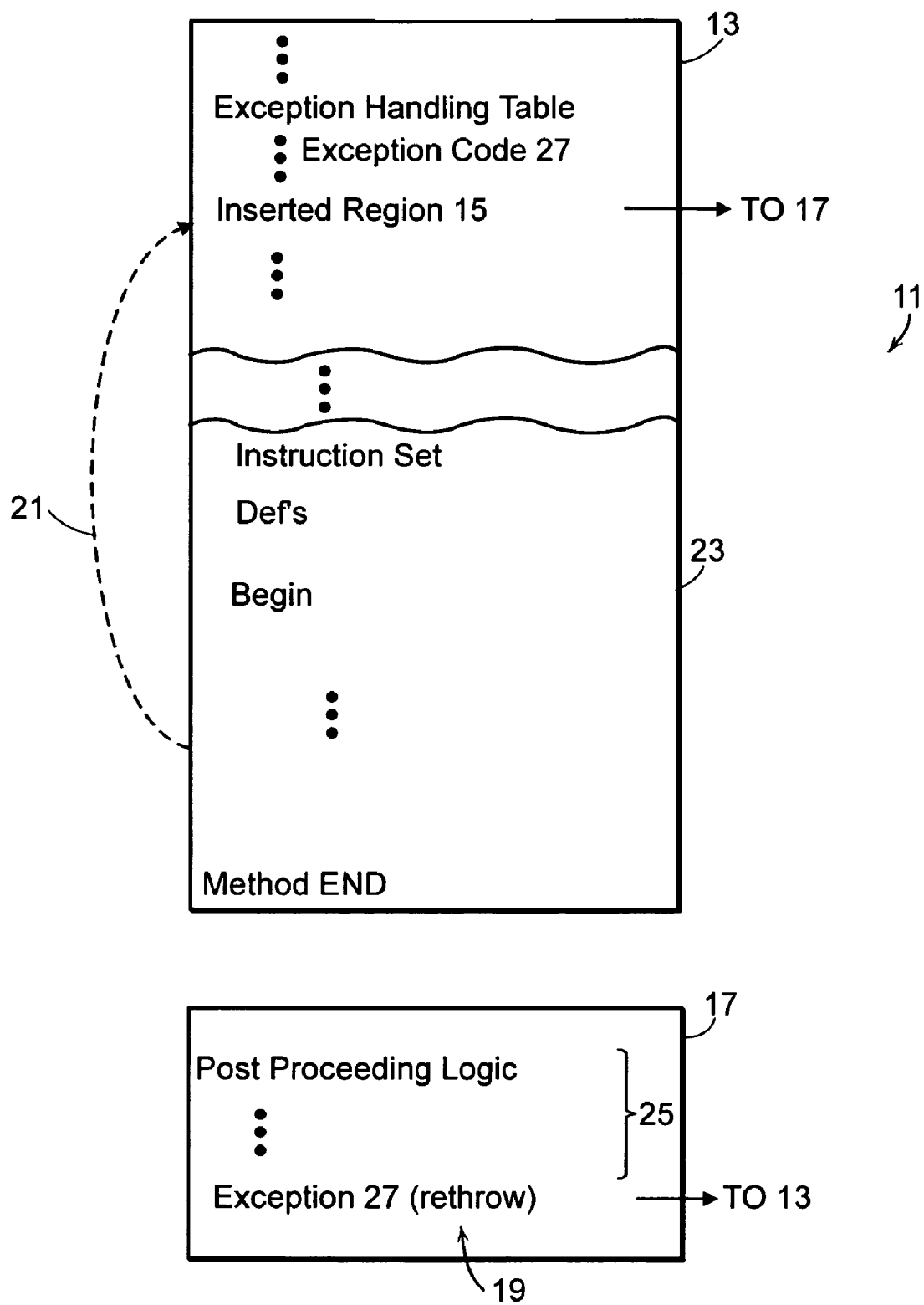
FIG. 1 is a block diagram of the present invention execution of post processing logic given an exception exiting of a subject function (e.g., JAVA application method).

To handle the "exception" exit path, the system described by the present invention modifies the byte codes of the method 11, including its exception handling table 13 as illustrated in FIG. 1. A new exception-handling region 15 is inserted into the table 13 which encompasses the entire function 23 and catches any exception (generally at 27). Upon an initial exception 21 exiting of the example method 11, control passes to the inserted exception handling code (region) 15 which calls handler 17. The handler 17 for new region 15 contains the desired postprocessing logic 25, and subsequently re-throws 19 the exception 27. This time the rethrown exception 27 is handled in the manner that Exception Handling Table 13 was originally coded to handle exceptions 27. Thus any exception 21, 27 that would propagate out of the method 11 (a) is initially caught, and (b) after execution of the desired postprocessing logic 25, is rethrown.

Figure 2:
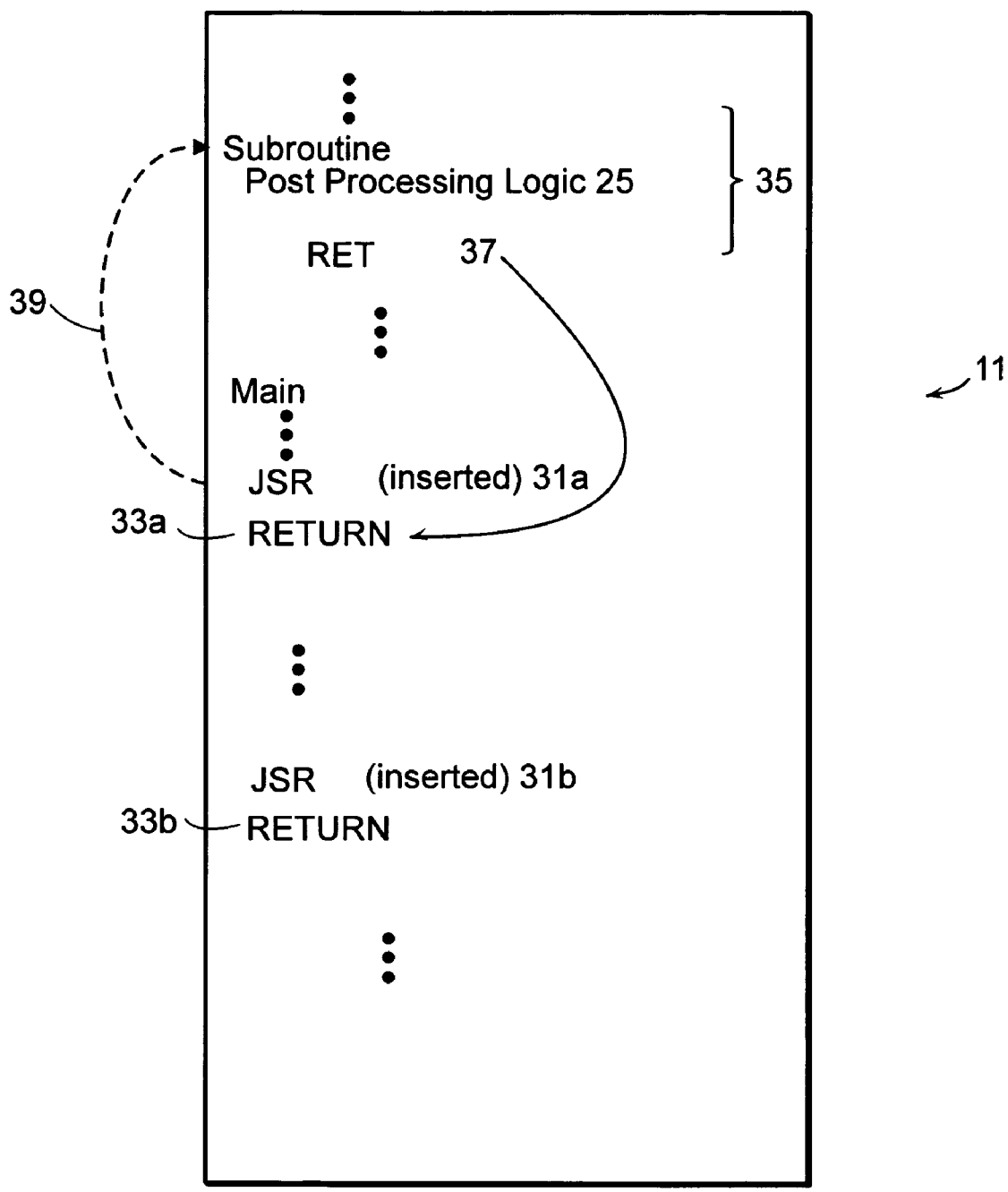
FIG. 2 is a block diagram of the present invention execution of post-processing logic given an ordinary exiting of a subject function (e.g., JAVA application method).

In the case of "ordinary" exits, the present invention provides different post-processing handling than for "exception" exits described above in FIG. 1. FIG. 2 is illustrative. To handle the "ordinary" exit path, the present invention modifies the byte codes of the subject method 11 by inserting a "JSR" instruction 31 before each original "RETURN" instruction 33 (of whatever form). The inserted JSR instruction 31 is a call to a subroutine 35 defined within the method 11. The target of the JSR instruction 31 is the postprocessing logic 25 (also inserted into method 11 by the present invention of FIG. 2). Immediately following postprocessing logic 25 is a RET instruction 37 which returns flow of control from the internal subroutine 35 to the next instruction after the initiating JSR instruction 31 (i.e., the JSR instruction 31 that originally called the subroutine 35). Thus the execution flow that would lead to any RETURN instruction 33 (causing the method 11 to exit) is interrupted, and execution flow enters the postprocessing logic 25, then resumes at the RETURN instruction 33.

In the example of FIG. 2, method 11 flow of control starts with a main set of instructions. Upon reaching a first inserted JSR instruction 31a, a call to subroutine 35 is made at 39. That is, JSR instruction 31a is a trigger point. Flow of control proceeds from JSR instruction 31a, to subroutine call 39 to processing of the instruction set of subroutine 35. Included in the subroutine 35 instruction set is the desired post processing logic 25. Upon completion of post processing logic 25, the RET instruction 37 at the end of subroutine 35 effectively passes control to the instruction immediately following the initially triggering JSR instruction 31a. In this example, control is thus passed to RETURN instruction 33a. Flow of control for method 11 resumes at RETURN instruction 33a.

In implementing the foregoing, care must be taken to insert and modify the method's 11 original byte codes such that the original semantics of the method 11 are not disturbed, aside from the intended side effects of executing the postprocessing logic 25. For example, because inserted instructions make the function 11 longer, internal branch instructions may need to be rewritten. In addition, the function's 11 exception table and debug information must be updated.

Thus, according to the present invention as described in FIGS. 1 and 2, there is an improved method (and system) of changing the existing instructions (e.g., JAVA application method 11) to assure the execution of desired postprocessing instructions (logic) 25. This improvement is possible for the present postprocessing (exit handling) invention, and distinct from the prior art because the present invention uses two different sets of postprocessing instructions: one for "ordinary exit" and one for "exception exit." By contrast, solutions that mimic "finally" processing have a single, common block of instructions for both types of exits.

Figure 3:
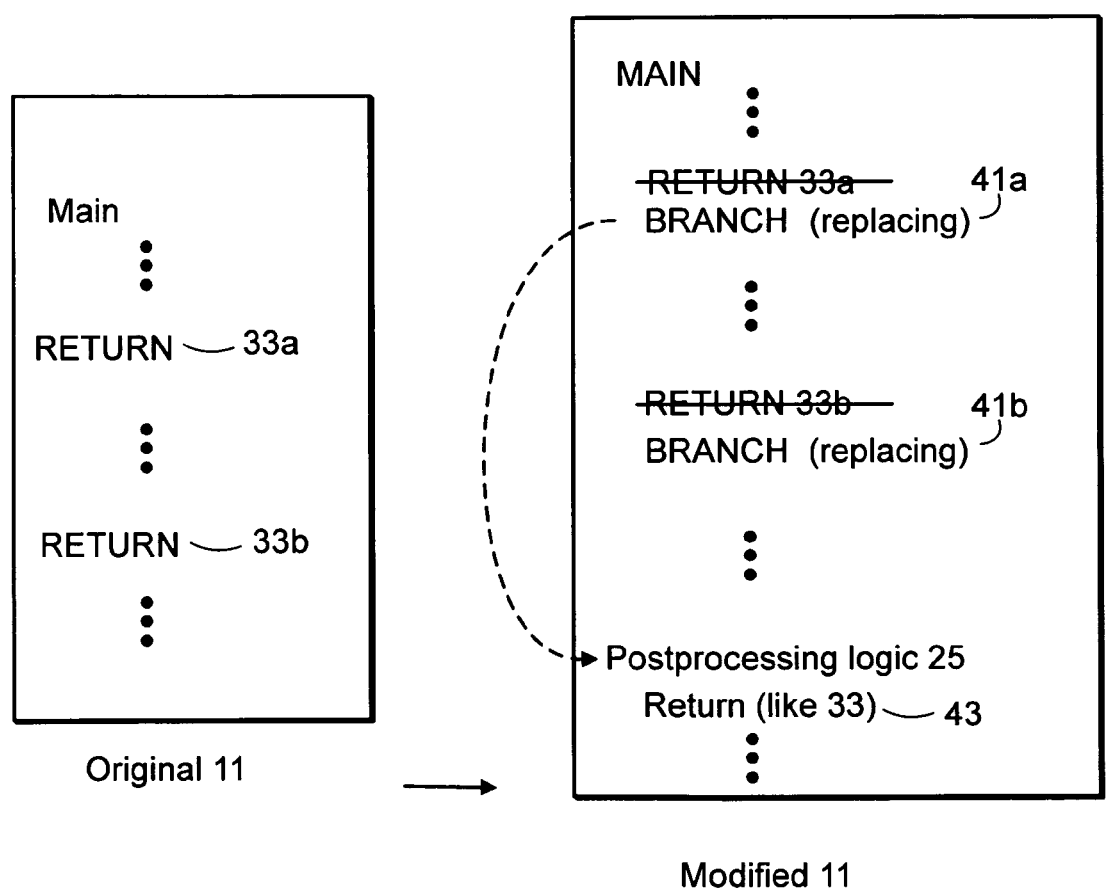
FIG. 3 is a block diagram of an alternative to the post processing handling of FIG. 2.

Turning to FIG. 3, illustrated is a modified or alternative to the "ordinary" exit handling of FIG. 2. On the left hand side is shown (represented) the original method 11. On the right hand side is illustrated the subject method 11 modified by the present invention alternative for handling "ordinary exits". Instead of inserting a JSR instruction 31 before each original RETURN instruction 33, the original RETURN instruction 33 (shown with overstrike) is replaced with an unconditional BRANCH instruction 41. The BRANCH instruction 41 jumps to the postprocessing code 25 for ordinary exits. In addition, instead of ending the postprocessing code 25 with a RET instruction 37 (FIG. 2), postprocessing code 25 is made to end with the same type of RETURN instruction 43 as the original RETURN instruction 33. This is possible because every RETURN instruction 33 in the original function 11 will be of the same type.

This improvement/alternative saves space in the subject function 11 because there are fewer instructions. It saves time because there is no JSR/RET processing 31, 37, and it saves the creation of a new local variable which is usually required to hold the return address of the JSR instruction 31. It also further distances this invention from existing art which describes using the JAVA mechanisms of "try"/"finally" to assure execution of postprocessing logic. The prior art mechanisms do not differentiate between normal/ordinary exit, exit by exception and exit from a "finally" block in contrast to the present invention.

According to the foregoing, the present invention employs byte-code modification (including modification of the exception handling table) to change flow of processor control in a method/function, such that all possible exit points pass through specified postprocessing logic, without wrapping the subject method inside another method.

Figure 4:
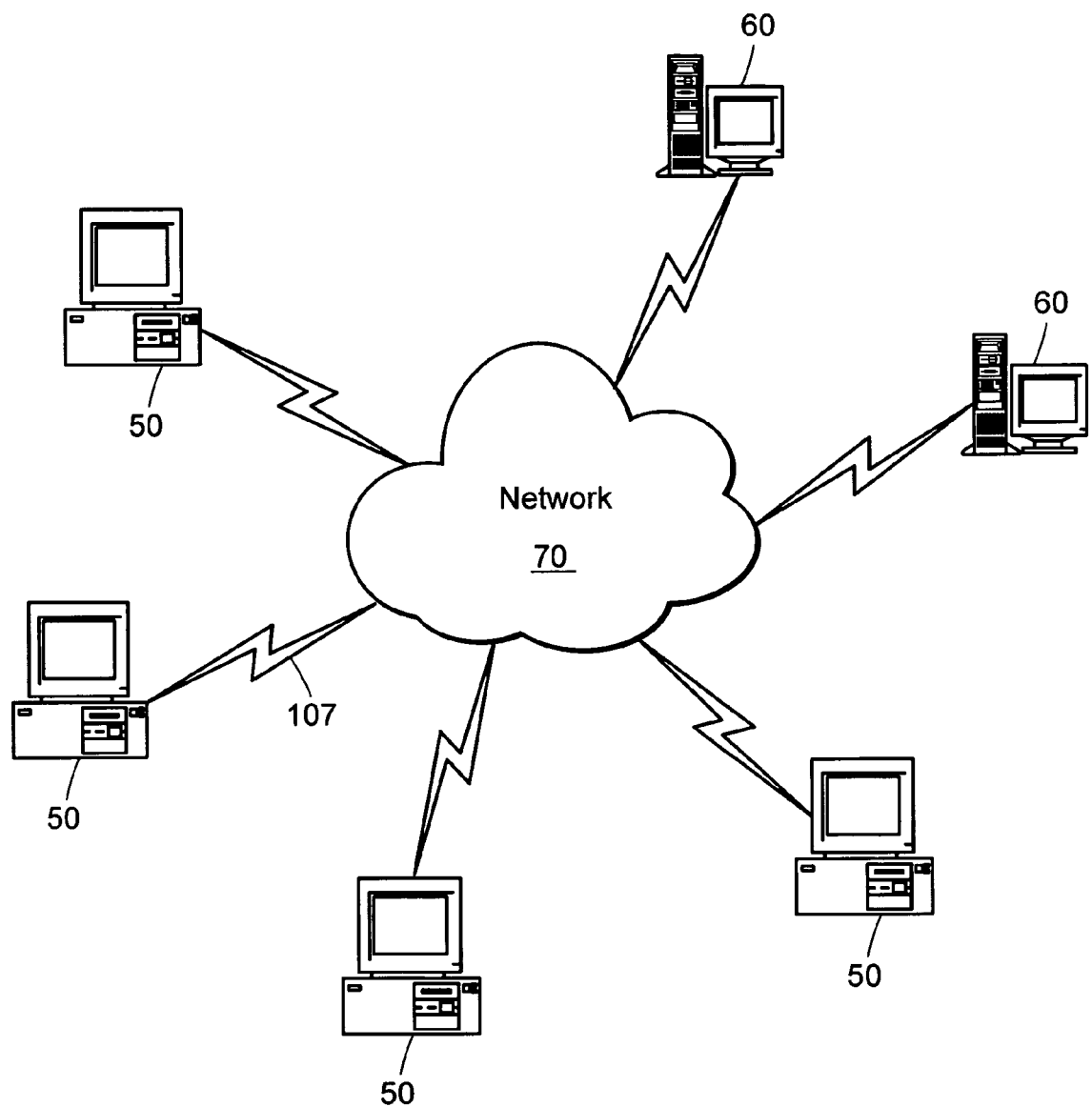
FIG. 4 is a schematic illustration of a computer network environment in which embodiments of the present invention may be practiced.

FIGS. 4 and 5 and illustrate a stand alone or a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

FIG. 5 is a diagram of the internal structure of a computer (e.g., client processor/device 50 or server computers 60) in the computer system of FIG. 4. Each computer 50, 60 contains system bus 80, where a bus is a set of hardware lines used for data transfer among the components of a computer or processing system. Bus 80 is essentially a shared conduit that connects different elements of a computer system (e.g., processor, disk storage, memory, input/output ports, network ports, etc.) that enables the transfer of information between the elements. Attached to system bus 80 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions used to implement an embodiment of the present invention (e.g., Program Routines 92, detailed above). Disk storage 95 provides non-volatile storage for computer software instructions 92 and data 94 used to implement an embodiment of the present invention. Central processor unit 84 is also attached to system bus 80 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals/medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the terms "method", "JAVA application method" and "function" are synonymous when used to generally reference that part of a computer program formed of a set of instructions for accomplishing a certain task. Further, "method", "function", etc. may be generically termed a computer program (or software) routine or procedure.

Further, the present invention may be employed in a stand alone computer architecture as well as in computer network systems. FIGS. 4 and 5 are for purposes of illustration only and not limitation of the present invention.

What is claimed is:

1. A method for executing postprocessing logic to a subject computer program routine, comprising the steps of:
   (a) as a function of exit type, modifying byte-codes of the subject computer program routine including for different exit-types inserting different instructions into the subject computer program routine resulting in modifying exit handling steps in the subject computer program routine, different exit types having respective different sets of exit handling steps, exit types including exception exit and ordinary exit;
   wherein said modifying byte codes of the subject computer program routine for ordinary exit includes:
   inserting a subroutine call instruction before each original RETURN instruction in the subject computer program routine;
   providing in the called subroutine an instruction to return to one of the original RETURN instructions; and
   replacing an original RETURN instruction in the subject computer program routine with a BRANCH instruction that enables (i) execution of the postprocessing logic and (ii) thereafter a return similar to the original RETURN instruction; and
   wherein said modifying byte codes of the subject computer program routine for exception exit includes inserting a working exception handling region in an exception handling table, the working exception handling region calling a handler that (i) executes the postprocessing logic, and (ii) subsequently rethrows an exception;
   (b) in each set of exit handling steps, executing desired postprocessing logic, there being different postprocessing logic for ordinary exit than for exception exit; and
   (c) resuming the subject computer program routine at an exit point wherein steps (a), (b) and (c) are performed in a manner free of wrapping code of the subject computer program routine inside another routine.

2. A method as claimed in claim 1 wherein for an ordinary exit, the inserted instructions include calling a subroutine that includes the desired postprocessing logic; and
   the subroutine returns processing control to the point of the ordinary exit.

3. A method as claimed in claim 1 wherein for an exit by an exception, the inserted instructions include calling a handler that includes the desired postprocessing logic; and
   the handler, after executing the postprocessing logic, rethrowing the exception to resume the exception processing of the subject computer program routine.

4. A method as claimed in claim 1 wherein for an ordinary exit, the inserted instructions include a branch instruction to the desired postprocessing logic.

5. A method as claimed in claim 1 wherein the subject computer program routine is a JAVA method.

6. A method as claimed in claim 5 wherein the steps of (a), (b) and (c) are performed in a manner free of wrapping the JAVA method inside another method.

7. A computer system for executing postprocessing logic for a subject computer program routine, comprising:
   a byte-code modification modifying byte-codes of the subject computer program routine as a function of exit type, including for different exit types the byte code modification inserting different instructions into the subject computer program routine resulting in different sets of exit handling instructions for different exit types including ordinary exit type and exception exit type, each set resulting from different modified byte codes of the subject computer program routine for different of exit types;
   postprocessing logic in each set of exit handling instructions, the postprocessing logic being different for ordinary exit type than for exception exit type and being executable by a computer in a manner free of wrapping code of the subject computer program routine inside another routine; and
   a processor responsive to the computer executing the postprocessing logic and resuming the subject computer program routine after executing exit handling instructions;
   wherein for ordinary exit the byte-code modification modifies byte-codes of the subject computer program routine by:
   inserting a subroutine call instruction before each original RETURN instruction in the subject computer program routine;
   providing in the called subroutine an instruction to return to one of the original RETURN instructions; and
   replacing an original RETURN instruction in the subject computer program routine with a BRANCH instruction that enables (i) execution of the postprocessing logic and (ii) thereafter a return similar to the original RETURN instruction; and
   wherein for exception exit the byte-code modification modifies byte codes of the subject computer program routine by inserting a working exception handling region in an exception handling table, the working exception handling region calling a handler that (i) executes the postprocessing logic, and (ii) subsequently rethrows an exception.

8. A computer system as claimed in claim 7 wherein for an ordinary exit, the exit handling instructions include a call to a subroutine in which the post processing logic is executed.

9. A computer system as claimed in claim 8 wherein the subroutine returns flow of control to the point of the ordinary exit.

10. A computer system as claimed in claim 7 wherein for an exit by an exception, the exit handling instructions include a handler which provides execution of the postprocessing logic.

11. A computer system as claimed in claim 10 wherein the handler, after execution of the postprocessing logic, rethrows the exception.

12. A computer system as claimed in claim 7 wherein the subject computer program routine is a JAVA method.

13. A computer system as claimed in claim 12 wherein the JAVA method has different types of exits; and
   the different sets of exit handling instructions being provided depending on the different types of exits and ensuring execution of the postprocessing logic, instead of the JAVA method being wrapped inside another method in order to ensure execution of the postprocessing logic.

14. A computer program product comprising a computer removable storage medium having computer readable code for controlling a processor to ensure execution of postprocessing logic for a subject computer program routine, by carrying out the steps of:
   (a) as a function of exit type, modifying byte codes of the subject computer program routine resulting in modified exit handling steps and providing resulting in different flow of processor control having the modified exit handling steps depending on exit type of exits in the subject computer program routine, including one set of exit handling steps for ordinary exits and a different set of exit handling steps for exits by exception;
wherein said modifying byte codes of the subject computer program routine for ordinary exit includes:
inserting a subroutine call instruction before each original RETURN instruction in the subject computer program routine;
providing in the called subroutine an instruction to return to one of the original RETURN instructions; and
replacing an original RETURN instruction in the subject computer program routine with a BRANCH instruction that enables (i) execution of the postprocessing logic and (ii) thereafter a return similar to the original RETURN instruction; and
wherein said modifying byte codes of the subject computer program routine for exception exit includes inserting a working exception handling region in an exception handling table, the working exception handling region calling a handler that (i) executes the postprocessing logic, and (ii) subsequently rethrows an exception;
(b) in each set of exit handling steps, executing desired postprocessing logic including executing different postprocessing logic for ordinary exit than for exits by exception; and
(c) resuming the subject computer program routine at respective exits in the subject computer program routine inside another routine;
wherein steps (a), (b) and (c) are performed in a manner free of wrapping code of the subject computer program routine.

15. A computer program product as claimed in claim 14 wherein for an ordinary exit, flow of control jumps to a subroutine that includes the desired postprocessing logic; and
the subroutine returns flow of control to point of the ordinary exit in the subject computer program routine.

16. A computer program product as claimed in claim 14 wherein for an ordinary exit, flow of control branches to the desired postprocessing logic; and
the postprocessing logic returns flow of control in a manner similar to the ordinary exit.

17. A computer program product as claimed in claim 14 wherein for an exit by an exception, flow of control passes to exception handling code which calls a handler, the handler executing the postprocessing logic and rethrowing the exception to resume the subject computer program routine.

18. A computer program product as claimed in claim 14 wherein the subject computer program routine is a JAVA method; and
the carrying out of steps (a), (b) and (c) ensure execution of the postprocessing logic in a manner free of wrapping the JAVA method inside another method.

* * * * *